United States Patent
Eguchi et al.

(10) Patent No.: US 11,939,448 B2
(45) Date of Patent: Mar. 26, 2024

(54) LIGHT REFLECTING BODY

(71) Applicant: Shiraishi Kogyo Kaisha, Ltd., Osaka (JP)

(72) Inventors: Kenichiro Eguchi, Amagasaki (JP); Yutaka Minamino, Amagasaki (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 78 days.

(21) Appl. No.: 17/320,788

(22) Filed: May 14, 2021

(65) Prior Publication Data

US 2021/0355295 A1 Nov. 18, 2021

(30) Foreign Application Priority Data

May 15, 2020 (JP) .................... 2020-085639

(51) Int. Cl.
*C08K 3/26* (2006.01)
*G02B 5/08* (2006.01)

(52) U.S. Cl.
CPC .............. *C08K 3/26* (2013.01); *G02B 5/0808* (2013.01); *C08K 2003/265* (2013.01); *C08K 2201/005* (2013.01); *C08K 2201/006* (2013.01)

(58) Field of Classification Search
None
See application file for complete search history.

(56) References Cited

U.S. PATENT DOCUMENTS

2015/0240040 A1* 8/2015 Kasahara ................. C08K 3/26
524/425

FOREIGN PATENT DOCUMENTS

| JP | 2007-45935 | A |   | 2/2007  |           |
|----|------------|---|---|---------|-----------|
| JP | 2007045935 | A | * | 2/2007  |           |
| JP | 2008-280498| A |   | 11/2008 |           |
| JP | 2016-27148 | A |   | 2/2016  |           |
| JP | 2017-116825| A |   | 6/2017  |           |
| JP | 2019-14785 | A |   | 1/2019  |           |
| JP | 2019014785 | A | * | 1/2019  | ........... C08G 63/605 |
| WO | WO-0046307 | A1| * | 8/2000  | .............. C08K 7/08 |
| WO | 2014/058057| A2|   | 4/2014  |           |

OTHER PUBLICATIONS

Uchiumi, R., Surface Treated Calcium Carbonate Filler, Feb. 22, 2007, machine translation of JP2007045935 (Year: 2007).*
Hara, S., Liquid Crystal Polyester Resin, Jan. 31, 2019, machine translation of JP2019014785 (Year: 2019).*
Office Action dated Oct. 6, 2020, issued in counterpart of Japanese Patent Application No. 2020-085639. (3 pages).
Office Action dated Feb. 16, 2021, issued in counterpart of Japanese Patent Application No. 2020-085639. (2 pages).

* cited by examiner

*Primary Examiner* — Alexandre F Ferre
(74) *Attorney, Agent, or Firm* — WHDA, LLP

(57) ABSTRACT

A light reflecting body includes a base containing a resin material and a calcium carbonate and includes a metal layer on the surface of the base. The resin material is selected from a polyester resin composition, a polyarylate resin composition, and a mixed resin composition thereof. The calcium carbonate has a BET specific surface area of 1 to 15 m$^2$/g, a pore distribution curve determined by mercury porosimetry that the top of a peak representing interparticle void size is in a pore size range of 0.1 to 1.0 µm, a particle size distribution determined by using an electron microscope that the proportion of particles having a particle size of 0.1 µm or less is 10% or less of the calcium carbonate, and the residue on a sieve having a mesh size of 45 µm after wet sieving of the calcium carbonate is 0.1% or less.

4 Claims, No Drawings

LIGHT REFLECTING BODY

BACKGROUND

1. Technical Field

The present invention relates to a light reflecting body including a base containing a resin material and a calcium carbonate and including a metal layer on the base.

2. Description of the Background

As a conventional light reflecting body such as a reflector and an extension used for automobile lamps and the like, a light reflecting body including a base made from a polyester resin composition and a light reflecting layer such as a metal deposited film on the base has been studied. In such a light reflecting body, an inorganic filler is added to the polyester resin to improve the heat resistance and other properties of the base. In such a case, before the formation of a metal deposited film, the base has been typically subjected to undercoating not to impair the luminance of a metal deposited film sequentially provided. The undercoating, however, complicates the working process and increases the cost as well as may limit the design freedom of a light reflecting body. There is therefore a demand for a light reflecting body having high luminance and uniform reflectance without undercoating. Meanwhile, as an attempt to produce a light reflecting body having high luminance, a polished mold has been used for resin molding to prepare a base. When a polished mold is used to mold a resin, however, the product may be difficult to be taken out to cause what is called irregular release, and this can decrease the yield.

JPA 2008-280498 discloses a light reflecting body that is prepared by molding a polyester resin composition containing a fine powder filler having an average particle size of 10 μm or less in a polyester resin. The light reflecting body in JPA 2008-280498 is reported to have high luminance and good surface nature. JPA 2016-27148 discloses a light reflecting body that is prepared by molding a resin composition containing an inorganic filler having an average primary particle size of 2.5 μm or less in polybutylene terephthalate resin pellets. The light reflecting body in JPA 2016-27148 is reported to have high strength, excellent mold release properties when produced, and an excellent appearance. JPA 2017-116825 discloses a light reflecting body that is prepared by molding a resin composition containing a calcium carbonate having an average particle size of 0.1 to 0.3 μm in a polyester resin. The light reflecting body in JPA 2017-116825 is reported to have particularly high luminance.

BRIEF SUMMARY

In these patent literatures, various inorganic fillers have been studied, but there is still a demand for an inorganic filler having higher dispersibility in a resin. There is also a demand for a light reflecting body having excellent mold release properties when a resin containing an inorganic filler is molded and having high glossiness of the surface of a metal layer on the molded resin base.

The present invention is therefore intended to provide a light reflecting body that has high surface glossiness and is produced by efficiently molding a mixture in which an inorganic filler having high dispersibility in a resin is dispersed in the resin to give a base and by forming a metal layer on the surface of the base.

A light reflecting body comprising:
a base containing a resin material and a calcium carbonate, the resin material being selected from the group consisting of a polyester resin composition, a polyarylate resin composition, and a mixed resin composition thereof; and
a metal layer on a surface of the base, wherein
the calcium carbonate has a BET specific surface area of 1 to 15 $m^2/g$,
the calcium carbonate has such a pore distribution curve determined by mercury porosimetry that a top of a peak representing interparticle void size is in a pore size range of 0.1 to 1.0 μm,
the calcium carbonate has such a particle size distribution determined by using an electron microscope that a proportion of particles having a particle size of 0.1 μm or less is 10% or less of the calcium carbonate, and
a residue on a sieve having a mesh size of 45 μm after wet sieving of the calcium carbonate is 0.1% or less.

According to the present invention, a particular calcium carbonate having high dispersibility is used as an inorganic filler to mold a base, and thus a light reflecting body having an excellent appearance can be provided.

DETAILED DESCRIPTION

An embodiment of the present invention will be described in further detail, but the present invention is not limited to the following embodiment.

An embodiment is a light reflecting body including a base containing a resin material and a calcium carbonate and including a metal layer on the surface of the base. In the embodiment, the base is typically a plate-like molded article having a particular thickness. The base may have any shape that is substantially a flat plate shape, and the shape can be changed depending on applications.

The resin material used in an embodiment is a single polymer material or a mixture of a plurality of polymer materials. The resin material is preferably selected from the group consisting of a polyester resin composition, a polyarylate resin composition, and a mixed resin composition thereof. The polyester resin is a polyester of a polycondensate of a polyvalent carboxylic acid and a polyol and a mixture thereof. The polyester resin is particularly preferably an aromatic polyester resin. Examples of the aromatic polyester resin include a polyethylene terephthalate resin (PET), a polypropylene terephthalate resin, a polybutylene terephthalate resin (PBT), a polyethylene naphthalate resin (PEN), a polybutylene naphthalate resin (PBN), a poly(cyclohexane-1,4-dimethylene-terephthalate) resin, and a polytrimethylene terephthalate resin. Examples further include an alkylene terephthalate copolymer containing an alkylene terephthalate building block as a main building block and a polyalkylene terephthalate mixture containing polyalkylene terephthalate as a main component. A polymer containing an elastomer component such as polyoxytetramethylene glycol (PTMG) or a copolymer of such an elastomer component may also be used. Examples of the polyalkylene terephthalate mixture include a mixture of PBT with a polyalkylene terephthalate other than PBT and a mixture of PBT with an alkylene terephthalate copolyester other than PBT. Of them, a mixture of PBT and PET, a mixture of PBT and polytrimethylene terephthalate, and a mixture of PBT and PBT/polyalkylene isophthalate are preferred, for example.

The polyarylate resin is a polyarylate of a polycondensate of a divalent phenol and a dibasic acid and a mixture thereof and is known as an amorphous, transparent, super engineering plastic. Examples of the polyarylate resin include a polycondensate of bisphenol A and phthalic acid and a poly-4,4'-isopropylidene diphenylene terephthalate/isophthalate copolymer. The polycondensate of bisphenol A and phthalic acid is particularly preferably used.

One of or a combination of the polyester resin and the polyarylate resin can be used as the resin material in an embodiment. The resin material can contain a resin other than the polyester resin, the polyarylate resin, and mixtures thereof as needed as long as the object of the present invention is not impaired. The resin material can contain common additives such as an antioxidant, a heat stabilizer, an ultraviolet absorber, a fibrous reinforcement, a lubricant, a flame retardant, an antistatic agent, a coloring agent, and a pigment. The content of these additives is preferably 10% by mass or less of the resin material used in an embodiment.

The base used in an embodiment contains calcium carbonate. Calcium carbonate is a calcium salt represented by chemical formula, $CaCO_3$. Calcium carbonate is a main component of shells, eggshells, limestone, chalk, and the like. Calcium carbonate is classified into heavy calcium carbonate (natural calcium carbonate) prepared by pulverization and classification of limestone and precipitated calcium carbonate (synthetic calcium carbonate) prepared by chemical reaction. In the present embodiment, synthetic calcium carbonate is preferably used. The synthetic calcium carbonate can be produced, for example, by reaction of calcium hydroxide with carbon dioxide gas. The calcium hydroxide can be produced, for example, by reaction of calcium oxide with water. The calcium oxide can be produced by calcination of a mixture of a raw limestone with coke or the like. In this case, carbon dioxide gas is generated during calcination. Hence, the carbon dioxide gas is blown into an aqueous suspension of calcium hydroxide and is reacted with the calcium hydroxide to produce calcium carbonate. Alternatively, synthetic calcium carbonate can also be produced by causticization reaction in which a slurry containing sodium carbonate (green liquor) is reacted with calcium hydroxide, a method in which a calcium chloride solution as a by-product in ammonia soda process is reacted with a sodium carbonate or ammonium carbonate solution, or a carbonation method of an exhaust gas from a lime kiln.

The synthetic calcium carbonate can have crystal forms including a calcite crystal form, an aragonite crystal form, and a vaterite crystal form, and a synthetic calcium carbonate having a calcite crystal form is particularly preferably used. The particles of the synthetic calcium carbonate preferably have a spherical shape, a substantially cubic shape, a spindle shape, or a needle shape, for example.

The calcium carbonate used in an embodiment may have a treated surface, as needed. Examples of the surface treatment include a surface treatment with an organic acid such as a fatty acid and a resin acid, silica treatment, condensed phosphoric acid treatment, and a treatment with a silane treatment agent or an organic titanate. These surface treatments may be combined. Examples of the silane treatment agent include a silane coupling agent, an organic silicon compound monomer, a modified silicone oil, and an oligomer thereof.

In an embodiment, the calcium carbonate is an inorganic filler to be added to the above resin material. Calcium carbonate has a smaller specific gravity than those of conventionally used inorganic fillers such as barium sulfate and talc. Use of calcium carbonate as the inorganic filler thus enables weight reduction of the light reflecting body in an embodiment. The calcium carbonate used in an embodiment is preferably used singly, but as needed, an inorganic filler such as barium sulfate and talc may be mixed.

The calcium carbonate used in an embodiment preferably has a BET specific surface area of 1 to 15 $m^2/g$. The BET specific surface area can be determined as follows: gas molecules (for example, nitrogen) having a known adsorption occupied area are adsorbed to a substance; and the amount thereof is measured to determine the BET specific surface area. The BET specific surface area of a calcium carbonate can be determined in accordance with the Japanese Industrial Standards, JIS Z 8830 "Determination of the specific surface area of powders (solids) by gas adsorption-BET method". The calcium carbonate used in an embodiment preferably has a BET specific surface area of 1 to 15 $m^2/g$, more preferably 3 to 15 $m^2/g$, and even more preferably 4 to 15 $m^2/g$. If the BET specific surface area is excessively large, particles aggregate together to form coarse particles, thus filler floating is caused on the surface of a molded resin article, and a resulting light reflecting body has poor glossiness. If the BET specific surface area is excessively small, primary particles are large, thus filler floating is caused on the surface of a molded resin article as with the case of an excessively large BET specific surface area, and a resulting light reflecting body has poor glossiness.

In an embodiment, the calcium carbonate preferably has such a pore distribution curve determined by mercury porosimetry that the top of the peak representing interparticle void size is in a pore size range of 0.1 to 1.0 μm. In the description, the determination of pore distribution by mercury porosimetry is a method in which a pressure is applied for penetration of mercury into pores of a substance, and the distribution of pores in the substance is determined from pressures and penetration amounts of mercury under pressure. The pore distribution by the mercury porosimetry can be determined by using a mercury porosimetric pore size meter (porosimeter), and a resulting pore distribution curve has a horizontal axis representing pore size and a vertical axis representing the number of particles. When the pore distribution of the calcium carbonate used in an embodiment is determined by mercury porosimetry, a peak based on pore size of the calcium carbonate particles and a peak based on distance between the calcium carbonate particles (interparticle void sizes) are observed, and the peak based on interparticle void size is typically larger. The top of the peak based on interparticle void size is preferably in a pore size range of 0.1 to 1.0 μm. The peak top is more preferably in a pore size range of 0.1 to 0.5 μm and even more preferably 0.1 to 0.3 μm. The peak top based on interparticle void size being in a pore size range of 0.1 to 1.0 μm means that the distances between calcium carbonate particles are substantially uniform. If the peak top representing interparticle void size is excessively large, primary particles are large, thus filler floating is caused on the surface of a molded resin article, and a resulting light reflecting body has poor glossiness. If the peak top representing interparticle void size is excessively small, primary particles are small, and the particles aggregate together to form coarse particles. Filler floating is thus caused on the surface of a molded resin article, and a resulting light reflecting body has poor glossiness.

In an embodiment, the calcium carbonate preferably has such a particle size distribution determined by using an electron microscope that the proportion of particles having a particle size of 0.1 μm or less is 10% or less of the calcium carbonate. The determination of particle size distribution by using an electron microscope is performed as follows:

particles are observed under a transmission electron microscope (TEM) at such a magnification as to count 200 to 1,000 particles; 200 to 1,000 particles are measured in a certain direction to determine Feret's diameters (tangential diameters) by using a commercially available image analyzing particle size distribution measurement software; and the number distribution of particles is determined. A resulting particle size distribution curve has a horizontal axis representing particle size and a vertical axis representing the number of particles. In the particle size distribution determined by direct observation of Feret's diameters of particles under an electron microscope, the proportion having a particle size of 0.1 µm or less is preferably 10% or less of calcium carbonate particles. The proportion is more preferably 8% or less and even more preferably 5% or less. In the particle size distribution determined by the method, the proportion having a particle size of 0.1 µm or less being 10% or less of calcium carbonate particles means that primary particles of calcium carbonate have highly uniform sizes. An excessively large proportion of calcium carbonate particles having a particle size of 0.1 µm or less means that many fine particles are contained and the particle size distribution is wide. This facilitates aggregate formation, thus filler floating is caused on the surface of a molded resin article, and a resulting light reflecting body has poor glossiness.

In an embodiment, the residue on a sieve having a mesh size of 45 µm after wet sieving of the calcium carbonate is preferably 0.1% or less. The wet sieving is a method for classifying a powder and is specifically a method of passing a dispersion slurry of a powder in a liquid through a sieve to remove coarse particles. When the calcium carbonate used in an embodiment is subjected to wet sieving through a sieve having a mesh size of 45 µm in accordance with the Japanese Industrial Standards, JIS K 5101-14, Determination of residue on sieve (Water method), the residual mass is preferably 0.1% or less, more preferably 0.08% or less, and even more preferably 0.05% or less. The residue after wet sieving by such a method being 0.1% or less means that calcium carbonate particles seldom contain giant particles including coarse particles and aggregated particles. If the residue after wet sieving is more than 0.1%, many giant particles including coarse particles and aggregated particles are contained, and the particle sizes are not uniform. Filler floating is thus caused on the surface of a molded resin article, and a resulting light reflecting body has poor glossiness.

Such a calcium carbonate as above can be produced. For example, calcium carbonate serving as crystal nuclei, such as a calcium carbonate synthesized by carbonation process or the like, is subjected to Ostwald ripening to allow particles to grow. To the resulting calcium carbonate particles, calcium hydroxide is added to give a slurry of the calcium carbonate and the calcium hydroxide, then the mixed slurry is sprayed into a reaction vessel filled with carbon dioxide gas. By repeating the process twice or more, particle growth is facilitated while aggregated particles are suppressed, and well-dispersible calcium carbonate particles usable in an embodiment can be prepared. Alternatively, calcium carbonate prepared by a usual method is classified by centrifugation, and a calcium carbonate having a particle size distribution that satisfies the above requirement can also be prepared. Alternatively, a drying method can be employed when calcium carbonate is prepared by a usual method. In the drying method, a wet material is introduced into a rapid flow of hot air, typified by a flash drier, and is instantaneously dried. The dried calcium carbonate can be further subjected to a forced vortex classifier to remove coarse particles including aggregates. In the classification, by setting the rotation speed of a classification rotor at a peripheral speed of 10 m/s or more, the calcium carbonate having a particle size distribution that is specified in an embodiment can also be prepared. The calcium carbonate satisfying the above requirements can be synthesized, and Brilliant 1500F (Shiraishi Kogyo Kaisha, Ltd.) can also be used as a commercial product, for example.

The base used in an embodiment contains a resin material and a calcium carbonate. In an embodiment, 1 to 40 parts by mass of the calcium carbonate is preferably mixed with 100 parts by mass of the resin material. The content of the calcium carbonate is more preferably 3 to 30 parts by mass and particularly preferably 5 to 20 parts by mass relative to 100 parts by mass of the resin material. If the content of the calcium carbonate is excessively small or excessively large, a molded base has a surface without smoothness, and this can make it difficult to improve the luminance of the light reflecting body.

In an embodiment, the resin material and the calcium carbonate can be mixed/kneaded by a known method. For mixing/kneading, for example, a ribbon blender, a Henschel Mixer, a Banbury mixer, a drum tumbler, a single screw extruder, a twin screw extruder, a ko-kneader, or a multi-screw extruder can be used. The heating temperature during kneading can vary, for example, with the melting point of a used resin material or the content of a calcium carbonate and can be appropriately set. The base in an embodiment can contain, in addition to the resin material and the calcium carbonate, additives necessary for molding the base.

The base used in an embodiment can be produced by molding a resin material containing a calcium carbonate. The molding method is not limited, and a known molding method can be employed. Specific examples include injection molding, gas assisted injection molding, hollow molding, extrusion molding, compression molding, calendering molding, and rotational molding. Of them, injection molding is specifically preferably employed.

On the surface of the base used in an embodiment, a metal layer is provided. The metal layer can be provided on the surface of the base by wet plating such as electroplating and electroless plating or by dry plating such as physical vapor deposition including vacuum deposition, ion plating, and sputtering and chemical vapor deposition (CVD) including plasma CVD, thermal CVD, organometallic CVD, and photo-CVD. The metal layer preferably formed directly on the base. This can simplify the production process. As needed, undercoating or primer treatment may be performed on the base, followed by the formation of the metal layer. Examples of the metal in the metal layer include aluminum, chromium, nickel, copper, and silver, and of them, aluminum is specifically preferably used. The metal layer formed of aluminum sufficiently reflects light and functions as a light reflecting layer on the surface of the light reflecting body in an embodiment.

The metal layer may have a coating layer for a design, an antistatic layer, or the like as long as the object of the present invention is not impaired.

The metal layer on the surface of the base used in an embodiment may have any thickness, and the thickness can be 10 to 100 nm, preferably 30 to 90 nm, and more preferably 50 to 80 nm. The thickness of the metal layer can be appropriately set depending on a reflection performance required for the light reflecting body in an embodiment, requirements for an appearance and a design, and the like.

The light reflecting body in an embodiment can be produced by forming a metal layer on a base. The light reflecting body in an embodiment can be specifically preferably used as the housing, reflector, or extension for lamps of automobiles and the like. The application of the light reflecting body of the present invention is not limited thereto and can also be applied to light reflecting bodies used in any fields including home electric appliances, lighting fixtures, toys, and furniture.

EXAMPLES

Embodiments of the present invention will next be specifically described. The present invention is not limited to the following examples without departing from the scope thereof

[Evaluation of Dispersibility of Calcium Carbonate]

First, 100 parts by mass of a polybutylene terephthalate resin (NOVADURAN, Mitsubishi Engineering-Plastics Corporation) and 10 parts by mass of a calcium carbonate (Shiraishi Kogyo Kaisha, Ltd.) were blended and uniformly mixed with a blender, and then the mixture was introduced into a twin-screw extruder at a cylinder temperature of 250° C. to give polyester resin composition pellets. The obtained pellets were injection-molded with an injection molding machine to give a plate-like resin molded article (60 mm×60 mm×2 mm) to be a base. The obtained resin molded article was cut with a diamond cutter or a glass cutter, and the formed cross section was observed under an optical microscope. Whether aggregates were observed in the cross section was visually evaluated. Samples were evaluated and classified into the following four grades: A: no aggregates were observed; B: aggregates were slightly observed; C: aggregates were observed; and D: many aggregates were observed. Grades A and B were regarded as acceptance.

[Evaluation of Surface Appearance of Resin Molded Article]

First, 100 parts by mass of a polybutylene terephthalate resin (NOVADURAN, Mitsubishi Engineering-Plastics Corporation) and 10 parts by mass of a calcium carbonate (Shiraishi Kogyo Kaisha, Ltd.) were blended and uniformly mixed with a blender, and then the mixture was introduced into a twin-screw extruder at a cylinder temperature of 250° C. to give polyester resin composition pellets. The obtained pellets were injection-molded with an injection molding machine to give a plate-like resin molded article (60 mm×60 mm×2 mm) to be a base. The mold used for the injection molding had a mirror surface polished with a file (#3000) on one face. For the molding, the cylinder temperature was set at 260° C., the mold temperature was set at 60° C., and the molding cycle time was set at 40 seconds. The molding conditions are low-injection-speed conditions where inorganic filler floating is likely to be caused on the surface of a resin molded article. The surface of the resulting resin molded article corresponding to the mirror surface was observed, and whether defects (whitening, surface roughness) due to inorganic filler floating were observed was visually evaluated. Samples were evaluated and classified into the following four grades: A: whitening nor surface roughness was observed; B: whitening and surface roughness were slightly observed; C: whitening and surface roughness were observed; and D: a lot of whitening and surface roughness were observed. Grades A and B were regarded as acceptance.

[Measurement of Glossiness of Aluminum Deposited Surface]

On the surface of the resin molded article corresponding to the mirror surface after the evaluation of surface appearance of resin molded article, aluminum was deposited. Aluminum deposition was performed by vacuum deposition using a small evaporation system for research and development (ULVAC, Inc.) to form an aluminum layer having a thickness of 80 nm. The glossiness was measured by using a glossimeter for parallel light measuring in accordance with the Japanese Industrial Standards, JIS Z 8741, Specular glossiness—Methods of measurement.

Properties of the calcium carbonates used as the inorganic filler in Examples and Comparative Example are shown in Table 1. In Table 1, "BET specific surface area" is a specific surface area determined in accordance with JIS Z 8830; "interparticle void size peak top" is the top of a peak representing interparticle void size in a pore distribution curve of a calcium carbonate determined by mercury porosimetry; "proportion of particles having a particle size of 0.1 µm or less" is a proportion of particles of the calcium carbonate having a particle size of 0.1 µm or less in a particle size distribution of a calcium carbonate determined by using an electron microscope; and "residue after wet sieving" is a mass ratio of a residue on a sieve having a mesh size of 45 µm after wet sieving. Each calcium carbonate shown in Table 1 is a synthetic calcium carbonate without surface treatment and is spherical particles of calcite crystals.

TABLE 1

Types of calcium carbonate and evaluation of resin molded articles

| | | Example 1 | Example 2 | Example 3 | Comparative Example 1 | Comparative Example 2 | Comparative Example 3 |
|---|---|---|---|---|---|---|---|
| Calcium carbonate | BET specific surface area ($m^2/g$) | 10 | 5 | 14 | 20 | 10 | 14 |
| | Interparticle void size peak top (µm) | 0.1 | 0.3 | 0.12 | 0.08 | 0.15 | 1.4 |
| | Proportion of particles having a particle size of 0.1 µm or less (%) | 5 | 1 | 9.5 | 60 | 5 | 50 |
| | Residue after wet sieving (%) | 0.05 | 0.05 | 0.08 | 0.05 | 2 | 2 |
| Calcium carbonate, dispersibility | | A | A | B | D | C | D |
| Plate-like resin molded article, surface appearance | | A | A | B | D | C | D |
| Aluminum layer, surface glossiness (%) | | 120 | 124 | 118 | 99 | 105 | 100 |

The resin molded articles (Examples 1 to 3) including the calcium carbonates satisfying the requirements of the present invention had excellent dispersibility of the inorganic filler, good surface appearance of the resin molded article, and high glossiness of the aluminum deposited surface. In contrast, the resin molded article in Comparative Example 1 not satisfying the requirement of BET specific surface area, interparticle void size peak top, or proportion of particles having a particle size of 0.1 μm or less had poor dispersibility of the inorganic filler, poor surface appearance of the resin molded article, and low glossiness. The resin molded article in Comparative Example 2 not satisfying the requirement of residue after wet sieving had slightly better evaluation results than those of the resin molded article in Comparative Example 1 but had inferior dispersibility of the inorganic filler to each resin molded article in Examples, and whitening and roughness were observed on the surface. The resin molded article in Comparative Example 3 not satisfying the requirement of interparticle void size peak top, proportion of particles having a particle size of 0.1 μm or less, or residue after wet sieving had poor dispersibility of the inorganic filler, poor surface appearance of the resin molded article, and low glossiness.

What is claimed is:

1. A light reflecting body comprising:
    an injection molded base containing a resin material and a calcium carbonate, the resin material being polybutylene terephthalate composition; and
    a metal layer on a surface of the injection molded base, wherein
    the calcium carbonate has a BET specific surface area of 1 to 15 $m^2/g$,
    the calcium carbonate has such a pore distribution curve determined by mercury porosimetry that a top of a peak representing interparticle void size is in a pore size range of 0.1 to 1.0 μm,
    the calcium carbonate has such a particle size distribution determined by using an electron microscope that a proportion of particles having a particle size of 0.1 μm or less is 10% or less of the calcium carbonate, and
    a residue on a sieve having a mesh size of 45 μm after wet sieving of the calcium carbonate is 0.1% or less.

2. A light reflecting body according to claim 1, wherein the calcium carbonate has a BET specific surface area of 5 to 10 $m^2/g$.

3. A light reflecting body according to claim 1, wherein the calcium carbonate has such a pore distribution curve determined by mercury porosimetry that a top of a peak representing interparticle void size is in a pore size range of 0.1 to 0.3 μm.

4. A light reflecting body according to claim 1, wherein a residue on a sieve having a mesh size of 45 μm after wet sieving of the calcium carbonate is 0.05% or less.

* * * * *